United States Patent
Kim et al.

(10) Patent No.: US 12,371,520 B2
(45) Date of Patent: Jul. 29, 2025

(54) COPOLYMER DISPERSANT AND DISPERSION USING SAME

(71) Applicant: HANSOL CHEMICAL CO., LTD, Seoul (KR)

(72) Inventors: Kwang-In Kim, Jeollabuk-do (KR); Jin-Ju Eom, Jeollabuk-do (KR); Chang-Beom Kim, Jeollabuk-do (KR); Se-Man Kwon, Jeollabuk-do (KR); Si-Jin Song, Jeollabuk-do (KR); Jae-Hee Han, Jeollabuk-do (KR); Seung-Heon Kim, Jeollabuk-do (KR); Chan-Su Park, Jeollabuk-do (KR)

(73) Assignee: HANSOL CHEMICAL CO., LTD, Seoul (KR)

( * ) Notice: Subject to any disclaimer, the term of this patent is extended or adjusted under 35 U.S.C. 154(b) by 0 days.

(21) Appl. No.: 18/568,229

(22) PCT Filed: Feb. 21, 2022

(86) PCT No.: PCT/KR2022/002503
§ 371 (c)(1),
(2) Date: Dec. 7, 2023

(87) PCT Pub. No.: WO2023/277297
PCT Pub. Date: Jan. 5, 2023

(65) Prior Publication Data
US 2024/0287230 A1 Aug. 29, 2024

(30) Foreign Application Priority Data
Jun. 29, 2021 (KR) .................. 10-2021-0084505

(51) Int. Cl.
C08F 220/18 (2006.01)
C08F 220/30 (2006.01)
C08K 3/04 (2006.01)
H01G 11/36 (2013.01)
H01M 4/62 (2006.01)

(52) U.S. Cl.
CPC .... *C08F 220/1818* (2020.02); *C08F 220/301* (2020.02); *C08K 3/041* (2017.05); *H01G 11/36* (2013.01); *H01M 4/62* (2013.01); *C08K 2201/001* (2013.01); *C08K 2201/005* (2013.01)

(58) Field of Classification Search
CPC .................................................. C08F 220/301
See application file for complete search history.

(56) References Cited

U.S. PATENT DOCUMENTS

| 7,655,708 | B2 | 2/2010 | House et al. | |
|---|---|---|---|---|
| 2012/0104329 | A1* | 5/2012 | Meyer | C08L 53/00 977/932 |
| 2020/0295371 | A1 | 9/2020 | Ishida et al. | |
| 2022/0177691 | A1* | 6/2022 | Kinoshita | C01B 32/174 |

FOREIGN PATENT DOCUMENTS

| CA | 2227586 A1 * | 2/1997 | C08L 75/14 |
|---|---|---|---|
| JP | S60-92360 A | 5/1985 | |
| JP | 2004-281055 A | 10/2004 | |
| JP | 2019-61755 A | 4/2019 | |
| JP | 2019-189731 A | 10/2019 | |
| JP | 2020-102421 A | 7/2020 | |
| JP | 2020-187991 A | 11/2020 | |
| JP | 2020-189770 A | 11/2020 | |
| KR | 2017-0055923 A | 5/2017 | |
| WO | WO 2020208881 A1 * | 10/2020 | C01B 32/174 |

OTHER PUBLICATIONS

Gupta, "Compatibilisation of 1D/2D graphitic nanomaterials and poly(propylene) via non-covalent functionalisation with poly(acrylate)s", PhD thesis, University of Warwick, 2018.
Bozkir, "Preparation and performance analysis of acrylonitrile based nanocomposite membranes for chromium (VI) removal from aqueous solutions", Thesis, Dec. 1, 2010.
Ratna, e tal., "Toughening of epoxy resin by modification with 2-ethylhexyl acrylate-acrylic acid copolymers", Polymer International, vol. 49, No. 3, pp. 309-315, Mar. 1, 2000.
Zhao, et al., "Conductive Polymer Binder for High-Tap-Density Nanosilicon Material for Lithium-Ion Battery Negative Electrode Application", Nano Letters, vol. 15, No. 12, pp. 7927-7932, Nov. 24, 2015.

* cited by examiner

*Primary Examiner* — Khanh T Nguyen
(74) *Attorney, Agent, or Firm* — BakerHostetler

(57) ABSTRACT

A copolymer and a dispersion using same, the copolymer including two or more monomers selected from among a monomer containing two or more substituted or unsubstituted aromatic rings, a monomer containing a straight-chain or branched aliphatic hydrocarbon having 5 to 22 carbon atoms, and a polar monomer containing any one selected from the group consisting of cyano (CN), pyrrolidone (NC4H6O) and carboxylic acid (COOH).

16 Claims, No Drawings

COPOLYMER DISPERSANT AND DISPERSION USING SAME

CROSS-REFERENCE TO RELATED APPLICATIONS

This application is a National Stage of International patent application PCT/KR2022/002503, filed on Feb. 21, 2022, which claims priority to foreign Korean patent application No. KR 10-2021-0084505, filed on Jun. 29, 2021, the disclosures of which are incorporated by reference in their entireties.

FIELD OF THE INVENTION

The present disclosure relates to a copolymer dispersant and a dispersion using the same, and to a dispersant capable of increasing the dispersibility of carbon materials, especially carbon nanomaterials, such as carbon nanotubes, even when used in a small amount, and a dispersion using the same.

BACKGROUND

Carbon materials have unique mechanical, electrical, and thermal properties and thus are used in various fields of electronics, biotechnology, medicine, and the like. Recently, in addition to existing carbon materials such as graphite, activated carbon, and carbon black, carbon nanomaterials, such as carbon nanotubes, fullerenes, and graphene, have been receiving attention.

On the other hand, for efficient use of carbon materials, the carbon materials must be effectively dispersed in a matrix of various materials.

However, carbon materials, especially carbon nanomaterials, tend to aggregate in the matrix due to the strong Van der Waals forces. Carbon materials cannot exhibit unique properties when aggregating in a matrix, leading to a problem of deterioration in uniformity.

Methods of dispersing carbon materials include mechanical dispersion using physical forces such as high shear forces, ultrasonic waves, and milling, dispersion using dispersants, dispersion by surface modification, and the like.

However, there is a problem that mechanical dispersion and dispersion by surface modification easily cause damage to carbon materials, and such damage significantly deteriorates the unique properties of the carbon materials (for example, electrical conductivity, thermal conductivity, and the like).

Therefore, research is being actively conducted on dispersing carbon materials using dispersants. In particular, to efficiently disperse carbon nanomaterials such as carbon nanotubes, research is being intensively in progress on wrapping a carbon nanomaterial with a polymer dispersant or on using the π-π interaction between the p orbital of the aromatic ring of a polymer dispersant and the p orbital of a carbon nanomaterial.

However, there are still not many dispersants capable of efficiently dispersing carbon materials, especially carbon nanomaterials, while maintaining the unique properties thereof, so research on this is demanding.

DOCUMENT OF RELATED ART

Patent Document (Patent Document 1) U.S. Pat. No. 7,655,708

SUMMARY OF THE INVENTION

Hence, the present disclosure aims to provide a dispersant capable of efficiently dispersing carbon materials (especially carbon nanomaterials) even when used in a small amount.

In addition, the present disclosure aims to provide a dispersion using the dispersant.

However, the problems to be solved by the present disclosure are not limited to the above description, and other problems can be clearly understood by those skilled in the art from the following description.

Technical Solution

In one aspect of the present application, a copolymer represented by Formula 1 is provided.

[Formula 1]

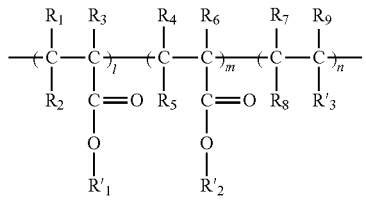

In Formula 1,
$R_1$ to $R_9$ are each independently hydrogen or a straight-chain or branched-chain hydrocarbon having 1 to 4 carbon atoms,
$R'_1$ is a straight-chain or branched-chain aliphatic hydrocarbon having 5 to 22 carbon atoms,
$R'_2$ includes two or more substituted or unsubstituted aromatic rings,
$R'_3$ includes any one or more selected from the group consisting of cyano (CN), pyrrolidone ($NC_4H_6O$), and carboxylic acid (COOH),
m and n are each independently integers of 0 to 4,000, and l is an integer of 1 to 7,000.
(However, when either m or n is 0, the remainder is not 0)

In another aspect of the present application, a dispersant containing the copolymer is provided.

In a further aspect of the present application, a dispersion containing the dispersant and a solvent is provided.

In yet another aspect of the present application, an electrode slurry composition, electrode, or secondary battery containing the dispersant is provided.

Advantageous Effects

A copolymer, according to the present disclosure, can efficiently disperse carbon materials (especially carbon nanomaterials) even when used in a small amount as a dispersant.

In addition, a dispersion using the dispersant of the present disclosure can be used in various fields (for example, batteries, electrodes of capacitors, and the like) where carbon materials are required to be dispersed.

BEST MODE

Hereinafter, the action and effect of the present disclosure will be described in detail through specific embodiments of the disclosure. However, these embodiments are provided only for illustrative purposes, and the scope of the present disclosure is not limited to the following embodiments.

All terms including technical and scientific terms used herein have the same meaning as commonly understood by those skilled in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Therefore, the configuration of embodiments described herein are merely examples and do not exhaustively present the technical spirit of the present disclosure. Accordingly, it should be appreciated that there may be various equivalents and modifications that can replace the embodiments and the configurations at the time at which the present application is filed.

As used herein, the singular forms are intended to include the plural forms as well, unless the context clearly indicates otherwise. It will be further understood that the terms "comprise", "include", "have", and the like when used herein, specify the presence of stated features, integers, steps, components, or combinations thereof but do not preclude the presence or addition of one or more other features, integers, steps, components, or combinations thereof.

A copolymer, according to one aspect of the present application, may be represented by Formula 1.

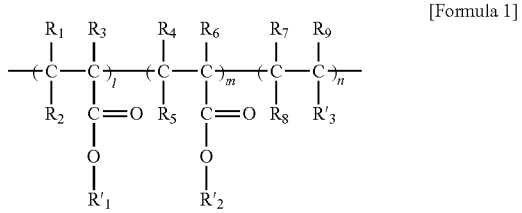

[Formula 1]

In Formula 1,

R1 to R9 are each independently hydrogen or a straight-chain or branched-chain hydrocarbon having 1 to 4 carbon atoms, $R'_1$ is a straight-chain or branched-chain aliphatic hydrocarbon having 5 to 22 carbon atoms, $R'_2$ includes two or more substituted or unsubstituted aromatic rings, $R'_3$ includes any one or more selected from the group consisting of cyano (CN), pyrrolidone ($NC_4H_6O$), and carboxylic acid (COOH), m and n are each independently integers of 0 to 4,000, and l is an integer of 1 to 7,000.

(However, when either m or n is 0, the remainder is not 0)

In other words, the copolymer is a monomer including two or more monomers selected from among: a monomer containing two or more substituted or unsubstituted aromatic rings; a monomer containing a straight-chain or branched-chain aliphatic hydrocarbon having 5 to 22 carbon atoms; and a polar monomer containing any one or more selected from the group consisting of cyano (CN), pyrrolidone ($NC_4H_6O$), and carboxylic acid (COOH).

In one embodiment, $R'_1$ in Formula 1 may include any one or more selected from the group consisting of n-pentyl, n-hexyl, n-heptyl, n-octyl, 2-ethylhexyl, n-nonyl, n-decyl, n-undecyl, lauryl, n-dodecyl, n-tridecyl, n-tetradecyl, n-pentadecyl, cetyl, n-hexadecyl, n-heptadecyl, stearyl, n-octadecyl, n-nonadecyl, n-icosyl, n-henicosyl, n-docosyl, isopentyl, isoheptyl, isooctyl, isononyl, isodecyl, isoundecyl, isododecyl, isotridecyl, isotetradecyl, isopentadecyl, isocetyl, isohexadecyl, isoheptadecyl, isostearyl, isooctadecyl, isononadecyl, isoicosyl, isohenicosyl, or isodocosyl.

That is, as the monomer containing $R'_1$, one type of monomer containing a straight-chain or branched-chain aliphatic hydrocarbon having 5 to 22 carbon atoms may be used alone, or two or more types of monomer containing a straight-chain or branched-chain aliphatic hydrocarbon having 5 to 22 carbon atoms may be used in combination.

Examples thereof may include a copolymer using only one type of stearyl methacrylate or lauryl methacrylate, a copolymer using both stearyl methacrylate and lauryl methacrylate, and the like.

The monomer containing the straight-chain or branched-chain aliphatic hydrocarbon having 5 to 22 carbon atoms may serve to wrap and disperse carbon materials (especially carbon nanomaterials such as carbon nanotubes) and to reduce the viscosity of the dispersion.

When the straight-chain or branched-chain aliphatic hydrocarbon has less than 5 carbon atoms, the carbon material (especially carbon nanotubes) may be insufficiently wrapped, resulting in a decrease in dispersion force, and when the straight-chain or branched-chain aliphatic hydrocarbon has more than 22 carbon atoms, compatibility with polar solvents, such as NMP, may be significantly deteriorated.

In addition, the monomer containing the straight-chain or branched-chain aliphatic hydrocarbon having 5 to 22 carbon atoms may be contained in an amount of 5 to 80 mol % based on 100 mol % of the total content of the entire copolymer.

When containing the monomer containing the straight-chain or branched-chain aliphatic hydrocarbon having 5 to 22 carbon atoms in an amount less than 5 mol %, the particle size and the viscosity of the dispersion may increase, and when containing the monomer containing the straight-chain or branched-chain aliphatic hydrocarbon having 5 to 22 carbon atoms in an amount exceeding 80 mol %, compatibility with polar solvents is deteriorated, resulting in phase separation.

In one embodiment, $R'_2$ in Formula 1 may include any one or more selected from the group consisting of benzyl, phenyl, phenoxy, naphthalene, anthracene, and pyrene, and may, for example, include any one or more selected from the group consisting of 3-phenoxy benzyl, 1-naphthyl, 2-naphthyl, 9-anthracenylmethyl, and 1-pyrene methyl.

On the other hand, $R'_2$ may be a hydrocarbon containing two or more substituted or unsubstituted aromatic rings.

In addition, as the monomer containing $R'_2$, one type of monomer containing two or more substituted or unsubstituted aromatic rings may be used alone, or two or more types of monomer containing two or more substituted or unsubstituted aromatic rings may be used in combination For example, when the aromatic ring is substituted, the substituent may be a straight-chain or branched-chain hydrocarbon having 1 to 4 carbon atoms, a substituent linked through oxygen (O) (for example, a substituted or unsubstituted aromatic ring linked through ether), or the like.

In one embodiment, the monomer containing $R'_2$ may include any one or more selected from the group consisting of 3-phenoxy benzyl acrylate and (1-pyrene) methyl 2-methyl-2-propenoate ((1-pyrene) 2-methyl-2-propenoate).

The monomer containing two or more substituted or unsubstituted aromatic rings may act as a dispersant through π-π interaction with carbon materials (especially carbon nanomaterials such as carbon nanotubes) and may exhibit compatibility with polar solvents such as NMP.

The monomer containing two or more substituted or unsubstituted aromatic rings may be contained in an amount of 0 to 60 mol % based on 100 mol % of the total content of the entire copolymer.

When using a monomer containing one aromatic ring, the dispersion effect is reduced, and when containing the monomer containing two or more substituted or unsubstituted aromatic rings in an amount exceeding 60 mol %, the amount of aliphatic hydrocarbon or polar monomer is reduced, resulting in increases in the viscosity of the dispersion and the particle size of the dispersed carbon material.

The polar monomer containing any one or more selected from the group consisting of cyano (CN), pyrrolidone ($NC_4H_6O$), and carboxylic acid (COOH) may serve to provide compatibility with polar solvents such as NMP.

Examples thereof may include a copolymer using only one type of N-vinyl-2-pyrrolidone or acrylic acid, a copolymer using both N-vinyl-2-pyrrolidone and acrylic acid, and the like.

The polar monomer may be contained in an amount of 0 to 60 mol % based on 100 mol % of the total content of the entire copolymer.

When containing the polar monomer in an amount exceeding 60 mol % of the entire copolymer, the compatibility with the polar solvent becomes excessively high, resulting in phase separation after dispersion and an increase in the particle size of the dispersed carbon material.

Even in the case where the polar monomer is not used, when using a monomer containing an aliphatic hydrocarbon having less than 13 carbon atoms while appropriately adjusting a ratio with a monomer containing two or more substituted or unsubstituted aromatic hydrocarbons, compatibility with polar solvents may be obtained.

In one embodiment, the copolymer may be a random or block copolymer depending on a synthesis process.

In one embodiment, the copolymer may have a number average molecular weight of 5,000 to 1,000,000.

When the number average molecular weight of the copolymer is less than 5,000, the fluidity of the dispersant may increase, leading to a deterioration in the ability to prevent re-aggregation of the carbon material, and when the number average molecular weight is more than 1,000,000, the viscosity may be excessively high for use.

A dispersant, according to another aspect of the present application, may contain the copolymer.

A dispersion, according to a further aspect of the present application, may contain the dispersant and a solvent.

In one embodiment, the solvent may be a polar solvent and may, for example, include any one or more selected from the group consisting of N-methyl-2-pyrrolidone (NMP), N-ethyl-2-pyrrolidone (NEP), dimethylformamide (DMF), dimethylacetamide (DMAc), dimethyl sulfoxide (DMSO), and γ-butyrolactone.

In one embodiment, the dispersion may further contain a carbon material. The carbon material may include any one or more selected from the group consisting of graphite, activated carbon, carbon black, carbon nanotubes, fullerenes, or graphene, but is not limited thereto.

The carbon nanotube may be a single-walled carbon nanotube, a multi-walled carbon nanotube, or a combination thereof.

In one embodiment, when the dispersion has 1.5 wt % of a non-volatile phase, the dispersion may have a viscosity of 3,300 to 18,000 cps, and the single-walled carbon nanotube, multi-walled carbon nanotube, or combination thereof dispersed in the dispersion may have a mean particle size (D50) of 10 μm or less.

A slurry composition, according to yet another aspect of the present application, may contain the dispersant. The slurry composition may be an electrode slurry and may include an electrode active material, a binder, a solvent, and the like.

For example, among the electrode active materials, a lithium-containing composite metal compound containing any one or more selected from the group consisting of Co, Ni, Mn, and Al, transition metal sulfides, such as $TiS_2$, $TiS_3$, and amorphous $MoS_3$, transition metal oxides, such as $Cu_2V_2O_3$, amorphous $V_2OP_2O_5$, $MoO_3$, $V_2O_5$, $V_6O_{13}$, and the like may be used.

In addition, examples of a negative electrode active material may include silicon-based active materials, tin-based active materials, amorphous carbon, graphite, natural graphite, mesocarbon microbeads (MCMB), carbonaceous materials such as pitch-based carbon fibers, conductive polymers such as polyacenes, and the like.

Examples of the silicon-based active materials may include silicon oxides, silicon-carbon composites, and silicon alloys.

The binder may include any one or more selected from the group consisting of poly(meth)acrylic acid, poly(meth)acrylamide, carboxymethyl cellulose, polyvinylidene fluoride, a polyhexafluoropropylene-polyvinylidene fluoride copolymer (P(VdF/HFP)), poly(vinyl acetate), polyvinyl alcohol, polyethylene oxide, polyvinylpyrrolidone, alkylated polyethylene oxide, polyvinyl ether, poly(methyl methacrylate), poly(ethyl acrylate), polytetrafluoroethylene, polyvinyl chloride, polyacrylonitrile, polyvinylpyridine, styrene-butadiene rubber, acrylonitrile-butadiene rubber, and copolymers thereof.

On the other hand, the slurry composition may further contain a conductive additive. The conductive additive is not particularly limited and may be appropriately selected depending on the type of battery or capacitor. For example, in the case of lithium-ion secondary batteries, carbon such as graphite and activated carbon may be used. In addition, in the case of nickel-hydrogen secondary batteries, cobalt oxide may be used, and nickel powder, cobalt oxide, titanium oxide, carbon, and the like may be used for the negative electrode.

Examples of the carbon may include acetylene black, furnace black, graphite, carbon fibers, and fullerenes.

The conductive additive is typically used in an amount of 1 to 20 parts by weight and preferably, 2 to 10 parts by weight, based on 100 parts by weight of the electrode active material.

A viscosity modifier, a plasticizer, and the like may be further added to an electrode slurry composition as needed.

An electrode, according to yet still another aspect of the present application, may contain the dispersant. The electrode may be a negative or positive electrode of primary batteries, secondary batteries, capacitors, fuel cells, and the like, but is not limited thereto.

MODE FOR INVENTION

Hereinafter, the present application will be described in more detail using examples, but the present application is not limited thereto.

Example 1

After putting 45.2 g of 3-phenoxy benzyl acrylate, 45.2 g of stearyl methacrylate, 9.6 g of acrylic acid, and 209.1 g of N-methyl pyrrolidone into a five-necked flask reactor, a reflux condenser and a thermometer were installed, and nitrogen gas was then added while raising the temperature to 65° C. When the resulting mixture reached 65° C., 0.25 g of 2,2'-azobis-2,4-dimethyl valeronitrile (V-65) was dissolved in 24.84 g of N-methyl pyrrolidone and then added dropwise for 30 minutes. After completion of the addition, the temperature was maintained at 65° C. for 7 hours, 0.12 g of 2,2'-azobis-2,4-dimethyl valeronitrile (V-65) was dissolved in 12 g of N-methyl pyrrolidone, added, and maintained at 90° C. for 3 hours to synthesize a dispersant having 30% of a non-volatile phase After putting 0.26 g of the synthesized dispersant, 1.24 g of multi-walled carbon nanotubes (having a diameter of 10 nm and a length of 150 μm), 98.5 g of N-methyl pyrrolidone, and 200 g of 0.65-mm zirconia beads into a planetary ball mill, the resulting mixture was dispersed for 30 minutes at 400 rpm to prepare a dispersion.

Example 2

A dispersion was synthesized and prepared in the same manner as in Example 1, except for using 37.4 g of (1-pyrene)methyl 2-methyl-2-propenoate instead of 3-phenoxy benzyl acrylate, 55.1 g of lauryl methacrylate instead of stearyl methacrylate, and 7.5 g of methacrylic acid instead of acrylic acid.

Example 3

A dispersion was synthesized and prepared in the same manner as in Example 1, except for using 82.5 g of stearyl methacrylate and 17.5 g of acrylic acid while not using 3-phenoxy benzyl acrylate.

Example 4

A dispersion was synthesized and prepared in the same manner as in Example 1, except for using 50 g of 3-phenoxy benzyl acrylate and 50 g of lauryl methacrylate instead of stearyl methacrylate while not using acrylic acid.

Comparative Example 1

A dispersion was synthesized and prepared in the same manner as in Example 1, except that 36.4 g of benzyl methacrylate instead of 3-phenoxy benzyl acrylate, 52.4 g of stearyl methacrylate, and 11.2 g of acrylic acid.

Comparative Example 2

A dispersion was synthesized and prepared in the same manner as in Example 1, except for using 62.9 g of 3-phenoxy benzyl acrylate, 23.7 g of butyl acrylate instead of stearyl methacrylate, and 13.4 g of acrylic acid.

Comparative Example 3

A dispersion was synthesized and prepared in the same manner as in Example 1, except for adding 376.2 g of N-methyl pyrrolidone instead of 209.1 g and setting the initial reaction temperature at 90° C. instead of 65° C.

Comparative Example 4

A dispersion was synthesized and prepared in the same manner as in Example 1, except for adding 42 g of N-methyl pyrrolidone instead of 209.1 g, setting the initial reaction temperature at 60° C. instead of 65° C., and setting the reaction time to 12 hours instead of 7 hours.

Comparative Example 5

A dispersion was prepared in the same manner as in Example 1 by using hydrogenated nitrile butadiene rubber having a number average molecular weight of 70,000 as the dispersant.

Table 1 below shows specific compositions of the dispersant, NMP amounts, and reaction conditions for the dispersions of Examples 1 to 4 and Comparative Examples 1 to 4.

TABLE 1

|  | Monomer (g) | | | | | | | | NMP (g) | Reaction temperature (° C.) 65→ | Reaction time (hr) |
| --- | --- | --- | --- | --- | --- | --- | --- | --- | --- | --- | --- |
|  | PBA | SMA | AA | pyMMP | LMA | MAA | BMA | BA | 209.1 | 90 | 7 |
| Example 1 | 45.2 | 45.2 | 9.6 | — | — | — | — | — | 209.1 | 65→90 | 7 |
| Example 2 | — | — | — | 37.4 | 55.1 | 7.5 | — | — | 209.1 | 65→90 | 7 |
| Example 3 | — | 82.5 | 17.5 | — | — | — | — | — | 209.1 | 65→90 | 7 |
| Example 4 | 50 | — | — | — | 50 | — | — | — | 209.1 | 65→90 | 7 |
| Comparative Example 1 | — | 52.4 | 11.2 | — | — | — | 36.4 | — | 209.1 | 65→90 | 7 |
| Comparative Example 2 | 62.9 | — | 13.4 | — | — | — | — | 23.7 | 209.1 | 65→90 | 7 |
| Comparative Example 3 | 45.2 | 45.2 | 9.6 | — | — | — | — | — | 376.2 | 90 | 7 |
| Comparative Example 4 | 45.2 | 45.2 | 9.6 | — | — | — | — | — | 42 | 60→90 | 12 |

In Table 1, PBA, SMA, AA, pyMMP, LMA, MAA, BMA, and BA represent 3-phenoxy benzyl acrylate, stearyl methacrylate, acrylic acid, (1-pyrene)methyl 2-methyl-2-propenoate, lauryl methacrylate, methacrylic acid, benzyl methacrylate, and butyl acrylate, respectively.

Experimental Example

The number average molecular weight of each dispersant of Examples 1 to 4 and Comparative Examples 1 to 5 was measured using a GPC method.

In addition, solubility in NMP was determined by dissolving each dispersant of Examples 1 to 4 and Comparative Examples 1 to 5 in NMP and storing the resulting product at 25° C. for 24 hours to determine whether a phase separation occurred. According to the presence or absence of the phase separation, "X" and "O" were marked, respectively.

On the other hand, the viscosity of each dispersion of Examples 1 to 4 and Comparative Examples 1 to 5 was measured using a rheometer, and the viscosity was marked when the shear rate was 10. Regarding the particle size, the particle size of D50 was marked using Mastersizer 3000 (manufacturer: Malvern Panalytical).

Table 2 below shows the measured number average molecular weight and solubility in NMP of each dispersant of Examples 1 to 4 and Comparative Examples 1 to 5, viscosity of each dispersion, and particle size of the carbon nanotubes dispersed in each dispersion.

TABLE 2

| | Number average molecular weight | Solubility in NMP | Dispersion viscosity (cps) | Particle size (μm) |
|---|---|---|---|---|
| Example 1 | 27,880 | O | 3,501 | 5.4 |
| Example 2 | 32,503 | O | 4,502 | 6.1 |
| Example 3 | 30,260 | O | 3,452 | 5.8 |
| Example 4 | 25,305 | O | 16,960 | 8.0 |
| Comparative Example 1 | 25,720 | O | 4,265 | 15.8 |
| Comparative Example 2 | 23,530 | O | 20,155 | 20.2 |
| Comparative Example 3 | 3,506 | X | 3,053 | 15.6 |
| Comparative Example 4 | 1,050,005 | O | 30,230 | 6.1 |
| Comparative Example 5 | 71,744 | O | 4,066 | 11.8 |

In the case of Comparative Example 1 using a monomer (benzyl methacrylate) containing only one aromatic ring, it is confirmed that the carbon nanotubes failed to be sufficiently dispersed and thus had a much larger particle size than in the case of Examples 1 to 4.

In addition, in the case of Comparative Example 2 using alkyl-substituted butyl acrylate containing an aliphatic hydrocarbon having less than 5 carbon atoms, it was confirmed that not only the particle size of the carbon nanotubes was much larger but also the viscosity of the dispersion was much higher than those in the case of Examples 1 to 4.

On the other hand, in the case of Comparative Examples 3 and 4, in which the number average molecular weight was adjusted, the number average molecular weight was low at 3,506 in Comparative Example 3, and solubility in NMP was low, resulting in phase separation. In addition, it was confirmed that the carbon nanotubes failed to be sufficiently dispersed and thus had a much larger particle size than in the case of Examples 1 to 4.

Furthermore, in the case of Comparative Example 4, where the number average molecular weight was high at 1,050,005, it was confirmed that the viscosity of the dispersion was much higher than those in the case of Examples 1 to 4.

In the case of Comparative Example 5 using an existing dispersant rather than a copolymer dispersant, it was confirmed that the nanotubes failed to be sufficiently dispersed compared to the case of Examples 1 to 4, leading to an increase in the particle size of the carbon nanotubes.

In other words, the dispersions of Examples 1 to 4 were superior to the dispersions of Comparative Examples 1 to 5 in at least one aspect of the viscosity and particle size of the carbon nanotubes.

The dispersions of Examples 1 to 4 may be expected to have an excellent dispersion effect even when used in a relatively small amount in various fields where carbon materials are required to be dispersed by appropriately balancing the viscosity and particle size of carbon nanotubes.

The scope of the present disclosure is defined by the appended claims rather than the detailed description presented above. All changes or modifications derived from the meaning and scope of the claims and the concept of equivalents should be construed to fall within the scope of the present disclosure.

INDUSTRIAL APPLICABILITY

A copolymer, according to the present disclosure, may efficiently disperse carbon materials (especially carbon nanomaterials) even when used in a small amount as a dispersant.

In addition, a dispersion using the dispersant of the present disclosure may be used in various fields (for example, batteries, electrodes of capacitors, and the like) where carbon materials are required to be dispersed.

The invention claimed is:
1. A copolymer represented by Formula 1,

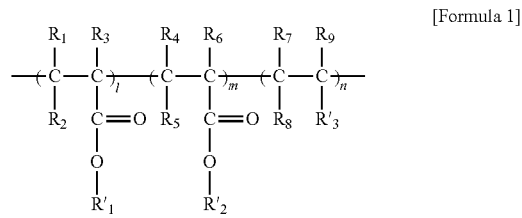

[Formula 1]

wherein in Formula 1,
R$_1$ to R$_9$ are each independently hydrogen or a straight-chain or branched-chain hydrocarbon having 1 to 4 carbon atoms,
R'$_1$ is a straight-chain or branched-chain aliphatic hydrocarbon having 5 to 22 carbon atoms,
R'$_2$ comprises two or more substituted or unsubstituted aromatic rings,
R'$_3$ comprises any one or more selected from the group consisting of cyano (CN), pyrrolidone (NC4H6O), and carboxylic acid (COOH),
m and n are each independently integers of 0 to 4,000,
wherein when either m or n is 0, the remainder is not 0, and
l is an integer of 1 to 7,000.

2. The copolymer of claim 1, wherein $R'_1$ comprises any one or more selected from the group consisting of n-pentyl, n-hexyl, n-heptyl, n-octyl, 2-ethylhexyl, n-nonyl, n-decyl, n-undecyl, lauryl, n-dodecyl, n-tridecyl, n-tetradecyl, n-pentadecyl, cetyl, n-hexadecyl, n-heptadecyl, stearyl, n-octadecyl, n-nonadecyl, n-icosyl, n-henicosyl, n-docosyl, isopentyl, isoheptyl, isooctyl, isononyl, isodecyl, isoundecyl, isododecyl, isotridecyl, isotetradecyl, isopentadecyl, isocetyl, isohexadecyl, isoheptadecyl, isostearyl, isooctadecyl, isononadecyl, isoicosyl, isohenicosyl, and isodocosyl.

3. The copolymer of claim 1, wherein $R'_2$ comprises any one or more selected from the group consisting of substituted or unsubstituted benzyl, phenyl, phenoxy, naphthalene, anthracene, and pyrene.

4. The copolymer of claim 1, wherein $R'_2$ comprises any one or more selected from the group consisting of 3-phenoxy benzyl, 1-naphthyl, 2-naphthyl, 9-anthracenylmethyl, and 1-pyrene methyl.

5. The copolymer of claim 1, wherein a monomer containing $R'_2$ comprises any one or more selected from the group consisting of 3-phenoxy benzyl acrylate and (1-pyrene)methyl 2-methyl-2-propenoate ((1-pyrene) 2-methyl-2-propenoate).

6. The copolymer of claim 1, wherein the copolymer is a random or block copolymer.

7. The copolymer of claim 1, wherein the copolymer has a number average molecular weight of 5,000 to 1,000,000.

8. A dispersant comprising the copolymer of claim 1.

9. A dispersion comprising:
the dispersant of claim 8; and
a solvent.

10. The dispersion of claim 9, wherein the solvent comprises any one or more selected from the group consisting of N-methyl-2-pyrrolidone, N-ethyl-2-pyrrolidone, dimethylformamide, dimethylacetamide, dimethyl sulfoxide, and γ-butyrolactone.

11. The dispersion of claim 9, further comprising a carbon material.

12. The dispersion of claim 11, wherein the carbon material comprises any one or more selected from the group consisting of graphite, activated carbon, carbon black, a single-walled carbon nanotube, a multi-walled carbon nanotube, a fullerene, and graphene.

13. The dispersion of claim 12, wherein when the dispersion comprises 1.5 wt % of a non-volatile phase, the dispersion has a viscosity of 3,300 to 18,000 cps, and
the single-walled carbon nanotube, the multi-walled carbon nanotube, or a combination thereof dispersed in the dispersion has a mean particle size (D50) of 10 μm or less.

14. An electrode slurry composition comprising the dispersant of claim 8.

15. An electrode comprising the dispersant of claim 8.

16. A secondary battery comprising the dispersant of claim 8.

* * * * *